Dec. 8, 1931.    G. T. PARR    1,835,719
EDIBLE ICE CREAM CONTAINER
Original Filed Oct. 13, 1924
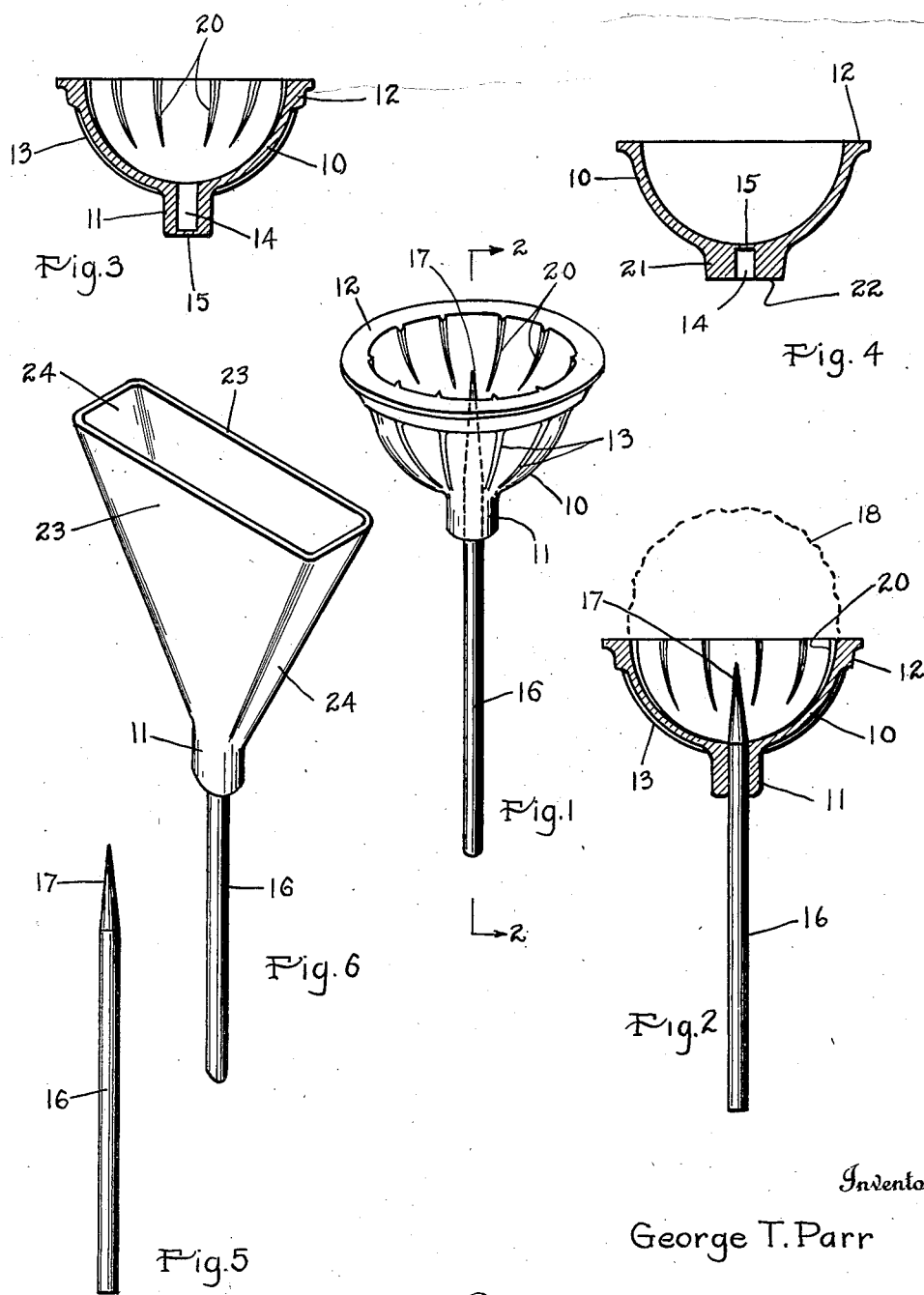

Patented Dec. 8, 1931

1,835,719

UNITED STATES PATENT OFFICE

GEORGE T. PARR, OF ST. PAUL, MINNESOTA, ASSIGNOR TO MARYLAND BAKING COMPANY, INC., OF BALTIMORE, MARYLAND, A CORPORATION OF MARYLAND

EDIBLE ICE CREAM CONTAINER

Application filed October 13, 1924, Serial No. 743,344. Renewed October 21, 1931.

My invention relates to edible ice cream containers and has for its object to provide a bowl shaped receptacle of edible material mounted uon the end of a handle simulating the appearance of a lollypop, in which a quantity of ice cream may be placed and from which the ice cream may be consumed.

Another object of the invention is to provide an ice cream cone having on the inner wall a plurality of inwardly projecting lugs to engage and to retain against loss a spherical helping of ice cream and to keep the helping of ice cream from rotating in the cone.

Another object of the invention resides in forming the receptacle of the shape of the ice cream to be served therein to reduce the amount of material used, and to form the handle removable so that the container and handle may be packed in a small carton.

Another object of the invention is to form said bowl shaped receptacle with an enlarged boss through which the handle projects for rigidly attaching the receptacle to said handle.

A still further object of the invention resides in arranging said handle so that the same extends into the bulk of the ice cream when positioned in the receptacle and assists in holding said ice cream from falling out as the walls of the receptacle are consumed.

A still further object resides in providing ribs within the receptacle which further aid in retaining the ice cream within the receptacle as the walls thereof are consumed.

A feature of the invention consists of forming the boss of the receptacle of such a shape that the same will form a base upon which the container may stand while the same is being filled with ice cream and by which the same may be handled instead of by the detachable handle.

A still further feature of the invention resides in forming the boss with a guideway adapted to receive and support the handle, which is closed at one end by a thin penetrable partition which when the container is used without a handle prevents the ice cream from leaking out and which is readily penetrated by the handle to permit of the insertion thereof into said guide when the device is used with a handle.

Other objects of the invention reside in the detailed construction of the device as shown in the following drawings, specification and claims.

Figure 1 is a perspective view of my invention.

Figure 2 is a sectional view of my invention taken on line 2—2 of Figure 1.

Figure 3 is a sectional view similar to Figure 2, illustrating the receptacle before the handle has been placed therein.

Figure 4 is a view similar to Figure 3 showing another form of the invention.

Figure 5 is an elevational view of one of the handles used with my invention.

Figure 6 is a perspective view similar to Figure 1 illustrating a modified form of my invention.

In Figure 1 I have shown my invention in one of its forms. The device comprises a bowl shaped receptacle 10 which is preferably formed in the shape of a hollow hemisphere, and is provided at the bottom with a boss or base 11. The upper portion of the bowl 10 is constructed with a reinforcing rim 12 extending completely around the same. Around the exterior of this device may be formed ribs 13 to assist in strengthening the same and for the purpose of ornamentation, if desired. It can readily be understood that other designs may be placed upon the exterior of this portion of the invention to give the same any desired appearance. For providing a handle for the device, a boss or base 11 is constructed, as shown in Figure 3. The same is formed with a longitudinal bore 14 extending from interior of the receptacle 10 and down to within a short distance of the bottom of said boss, leaving a thin partition 15 separating the same from the exterior of the device. The handle of the invention may be constructed of a round stick 16, as shown in Figure 5, which is provided at one end with a sharpened portion 17. The sharpened portion 17 of this stick is constructed to penetrate the partition 15 when it is desired to attach the same to the receptacle 10.

After the handle 16 has been correctly attached to the receptacle 10 the same takes the appearance shown in Figure 2 leaving the sharpened portion thereof projecting inwardly within the bowl or receptacle 10. When ice cream is placed within the bowl, the same is pierced with the sharpened portion 17 of stick 16 and becomes securely lodged within said receptacle, as shown in dotted lines at 18 in Figure 2.

As can readily be comprehended, the invention forms a convenient and practical device for holding ice cream while the same is being eaten. Although the receptacle 10 may be made of any desired material, it is preferable to construct the same of an edible substance, which is eaten together with the ice cream in the usual manner. As the walls of said receptacle are consumed, the sharpened point 17 of stick 16 which extends into the bulk of the ice cream prevents the ice cream from falling out, thereby holding it in place until the last morsel of it has been disposed of. In addition to this construction for holding the ice cream within the receptacle as the walls thereof are consumed, I also employ ribs 20 formed within the interior of said receptacle which also becomes lodged in the bulk of the ice cream and form an obstruction to the sliding of the ice cream out of the receptacle. In this manner the ice cream is securely held in place within the receptacle until entirely consumed.

If desired, the container may be used without the handle 16 by employing the same prior to the penetration of the partition 15. The device which is shown in Figure 3 would then be used and the ice cream directly filled in the same. The boss 11 in this case would be used for holding the device while the same is being eaten.

If desired, the container 10 may be constructed with a relatively enlarged boss 21 instead of the boss 11 shown in the other forms of the invention. This boss is preferably provided with a flat base 22 which permits the entire receptacle of being placed thereon and forms a suitable standard to hold said receptacle in upright position. By inverting the bore 14 and arranging the penetrable partition 15 at the upper portion of the said boss, the device may be readily used with or without the handle 16 without permitting any of the ice cream to fill said bore. This boss again provides a suitable structure by which the entire device may be held, in lieu of the handle 16, the same as the boss 11 shown in the other figures of the invention.

Although I have principally described the hemispherical containers, it can readily be understood that other types of containers may be employed, such as shown in Figure 6. In this figure I have illustrated a container having triangular shaped parallel side walls 23 and converging end walls 24 connected therewith. These walls are all integrally united with the boss 11, in which handle 16 is attached as in the other forms of the invention.

The advantages of my invention are manifest. The container may be constructed of a minimum amount of material to hold the required portion of ice cream customarily dispensed. The device may be used with or without the handle and when the handle is employed forms a structure simulating a lollypop, giving all of the advantages, including the cleanliness and sanitation associated therewith. The containers and handle may be packed in exceedingly compact condition in the shipping cartons, thereby economizing on space and cost of shipping. The containers may readily be filled by placing the same directly on the counter thereby eliminating the necessity of a special holder in filling a number of containers at a single time.

Although I have described my invention, merely illustrating a single embodiment thereof and adapted to a single use, I desire to have it understood that the invention may be constructed in different ways and put to uses other than those disclosed, as set set forth within the scope of the following claims.

Claims:

1. An ice cream container comprising a bowl shaped receptacle formed of edible crust-like material, a boss formed on said receptacle of a length greater than the thickness of the wall of said receptacle, said boss having a bore extending longitudinally thereof and to within a short distance of one end of said boss leaving a partition of less thickness than the wall of said container, said partition being adapted to be pierced by a sharpened stick insertable into said bore to serve as a handle therefor and to project inwardly into said receptacle.

2. An ice cream container comprising a bowl shaped receptacle, a boss formed on said receptacle issuing outwardly therefrom, said boss having a bore extending longitudinally thereof and partly through the same to provide a penetrable partition, said bore being formed to receive a sharpened stick adapted to penetrate said partition and hold said stick lodged within said bore.

3. An ice cream container comprising a bowl shaped receptacle formed of edible crust-like material, a boss formed on said receptacle issuing outwardly therefrom, said boss having a bore commencing at the outer end thereof and extending longitudinally to within a short distance of the inner end of said boss leaving a penetrable partition at the inner end of said bore and a sharpened stick adapted to be inserted into said bore to penetrate said partition and extend inwardly into said receptacle.

4. An ice cream cone circular in cross section having on the inner wall thereof, a plurality of inwardly projecting lugs to engage and to retain against loss a spherical helping of ice cream.

5. An ice cream cone circular in cross section having on the inner wall thereof a plurality of substantially vertical ribs, said ribs being of such shape in cross section as to indent a helping of ice cream pressed into the cone so that the helping of ice cream will be prevented from rotating in the cone.

6. An edible container for ice cream or other food product consisting of a bowl portion circular in cross section and an integral handle portion for holding the container while the food product and the bowl portion are being eaten together, said bowl portion having on the inner surface thereof a plurality of equispaced, inwardly extending, radial ribs to restrain movement of the food product in the container and to prevent its loss from the container.

In testimony whereof I affix my signature.

GEORGE T. PARR.